United States Patent [19]

Lecoffre et al.

[11] Patent Number: 4,556,523
[45] Date of Patent: Dec. 3, 1985

[54] MICROBUBBLE INJECTOR

[75] Inventors: Yves Lecoffre, Domene; Jean Marcoz, Grenoble, both of France

[73] Assignee: Alsthom-Atlantique, Paris, France

[21] Appl. No.: 638,930

[22] Filed: Aug. 9, 1984

[30] Foreign Application Priority Data

Aug. 9, 1983 [FR] France .................................. 83 13081

[51] Int. Cl.⁴ ................................................ B01F 3/04
[52] U.S. Cl. .................................... 261/123; 209/170; 210/221.2; 239/553.3; 261/76; 261/124
[58] Field of Search ......... 261/123, 76, 124, DIG. 75; 423/659; 239/553, 553.3; 210/221.2; 209/170

[56] References Cited

U.S. PATENT DOCUMENTS

| | | | |
|---|---|---|---|
| 2,330,589 | 9/1943 | Juell | 261/123 X |
| 2,376,536 | 5/1945 | Gonzer | 261/DIG. 75 |
| 2,559,864 | 7/1951 | Firth | 261/123 X |
| 3,722,679 | 3/1973 | Logue | 209/170 X |
| 4,138,335 | 2/1979 | Murphy | 261/123 X |
| 4,152,409 | 5/1979 | Nagao et al. | 261/76 X |
| 4,162,971 | 7/1979 | Zlokarnik et al. | 261/123 X |
| 4,337,152 | 6/1982 | Lynch | 261/DIG. 75 |
| 4,440,645 | 4/1984 | Kite | 261/DIG. 75 |
| 4,477,341 | 10/1984 | Schweiss et al. | 210/221.2 X |
| 4,490,248 | 12/1984 | Filippov et al. | 209/170 X |

FOREIGN PATENT DOCUMENTS

| | | |
|---|---|---|
| 328031 | 10/1920 | Fed. Rep. of Germany ... 261/DIG. 75 |
| 1940458 | 5/1970 | Fed. Rep. of Germany . |
| 2330460 | 6/1977 | France . |
| 2338071 | 8/1977 | France . |
| 458583 | 12/1936 | United Kingdom ................ 261/123 |

Primary Examiner—Richard L. Chiesa
Attorney, Agent, or Firm—Sughrue, Mion, Zinn, Macpeak & Seas

[57] ABSTRACT

In a microbubble injector usable to separate materials of different density by flotation, a deflector wall deflects radially a flow of water exiting under pressure from an injector hole and containing dissolved air at the saturation concentration. This procures cavitation which is localized at the edges of the hole and which generates the required microbubbles of air downflow thereof.

7 Claims, 3 Drawing Figures

MICROBUBBLE INJECTOR

BACKGROUND OF THE INVENTION

1. Field of the Invention

The invention concerns a microbubble injector. In this context the term "microbubbles" designates bubbles of gas in a liquid with a diameter of between 50 and 100 micrometers approximately. They may be bubbles of air in water, for example.

2. Description of the Prior Art

The function of bubbles of this kind may be to facilitate the separation of solid and liquid phases. Microbubbles formed in a first liquid mass may, for example, be injected into a second liquid mass. This provides for the elimination of solid particles from this second liquid mass by flotation, that is to say by the attachment of bubbles to these particles so as to cause the latter to rise to the surface of the liquid from which they may be eliminated by mechanical means, for example.

More generally, the injection of microbubbles into a liquid can make it possible to modify its physical and chemical properties.

The best known method for producing microbubbles is to procure electrolysis between two electrodes in the liquid, the microbubbles being formed by a gas released by the electrolysis and appearing on one of the electrodes. This process is costly when a large number of microbubbles is to produced.

It has also been proposed to construct a microbubble injector which comprises a source of liquid under pressure. The liquid is able to vaporize at ambient temperature and contains a dissolved gas. An "injector" wall formed with an "injector" hole is used to procure a flow of this liquid at high velocity into a chamber containing a second liquid mass. There is thus obtained in the flow firstly a drop in the pressure of the liquid accompanied by the formation of vapor mixed with said gas and then an increase in pressure downflow because of deceleration of the flow with sudden condensation of the vapor and formation of microbubbles of the gas.

In this known injector the liquid flow in question naturally assumes the form of a rectilinear jet extending from the injector hole, and its deceleration results from it being slowed down in the liquid mass into which it is injected.

This known injector offers acceptable energy efficiency only when the jet is fine, this efficiency being defined as the ratio of the number of bubbles formed to the energy consumed in creating the jet. More precisely, the injector hole must be of small diameter, preferably less than 0.5 millimeters. As a result of this the number of injector holes must be large if the number of bubbles to be formed is large, which increases the overall dimensions of the injector. Moreover, there is a significant risk of these small holes being blocked by solid impurities, entailing interruptions in operation, unless highly efficient and therefore necessarily expensive filters are used.

The objective of the present invention is to produce a microbubble injector which is simple to manufacture, compact, highly energy efficient, reliable and easy to maintain, and which provides a high flowrate of microbubbles with only slightly differing diameters.

SUMMARY OF THE INVENTION

The present invention consists in a microbubble injector comprising:
a liquid source adapted to supply at a first pressure a liquid in which at least one gas is dissolved and which is able to vaporize at ambient temperature at a second pressure lower than said first pressure,
a chamber containing a liquid mass at a third pressure which is lower than said first pressure but higher than said second pressure,
a wall,
an injector hole in said wall through which said liquid is caused to flow at high speed into said chamber, and
a deflector in said chamber facing said injector hole and substantially parallel to and spaced from said wall so as to form a divergent passage for said liquid, whereby said liquid is caused to flow radially away from said injector hole and vapor is caused to form in a cavitation pocket starting substantially at the edge of said injector hole and the pressure of said liquid is caused to increase rapidly downflow of said pocket by virtue of the rapidly and progressively increasing cross-section of said divergent passage.

Other objects and advantages will appear from the following description of examples of the invention, when considered in connection with the accompanying drawings, and the novel features will be particularly pointed out in the appended claims.

BRIEF DESCRIPTION OF THE DRAWINGS

Where the same component part is shown in more than one figure, it is always designated by the same reference numeral.

DESCRIPTION OF THE PREFERRED EMBODIMENTS

Figure 1:
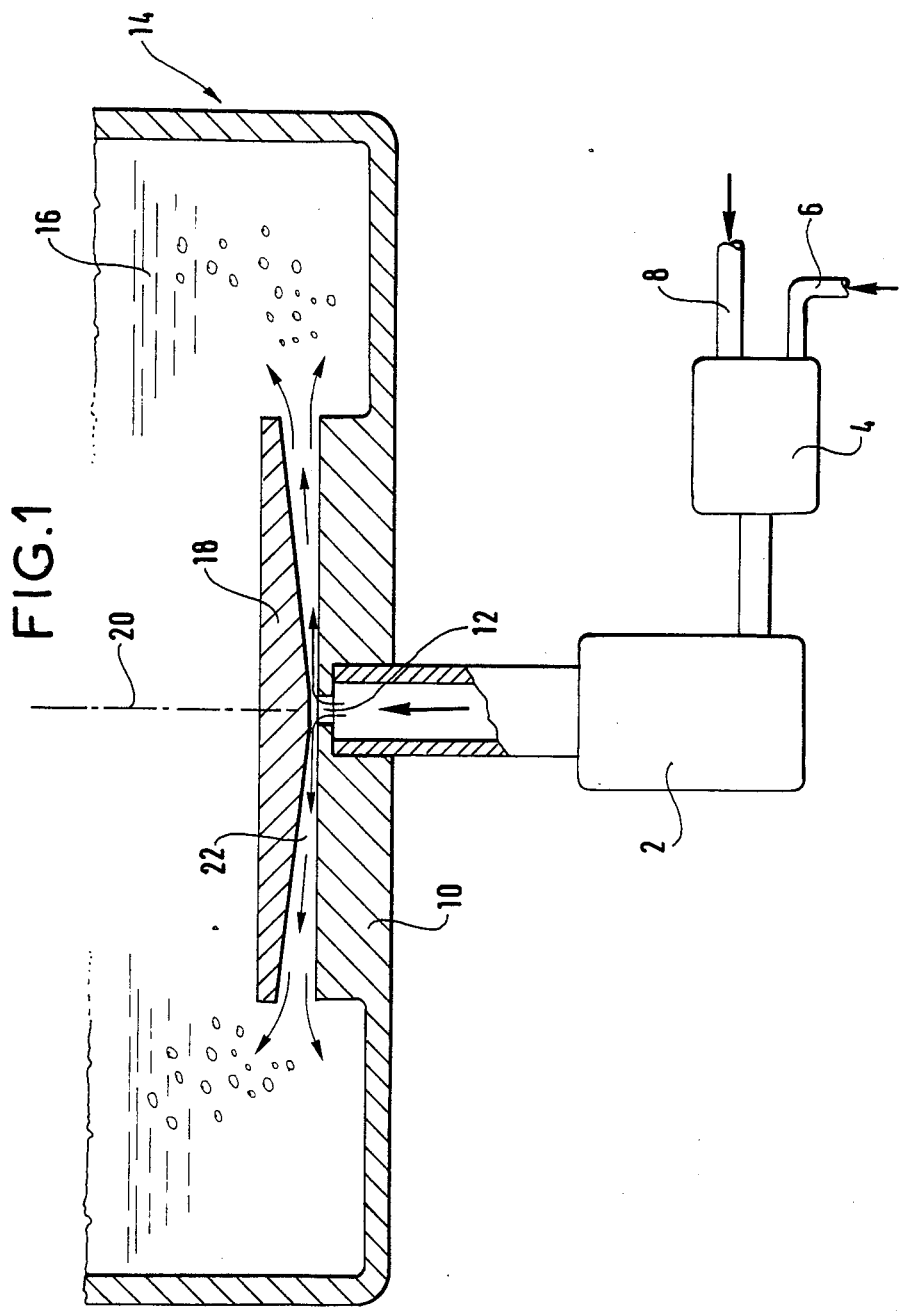
FIG. 1 shows a first embodiment of the injector in accordance with the invention in cross-section on a plane passing through the axis of the injector.

Referring to FIG. 1, a microbubble injector comprises a source of liquid under pressure containing at least one dissolved gas. The liquid supplied by this source contains said dissolved gas at a concentration which is not substantially different from the saturation concentration of this gas at the pressure of the source.

The source consists, for example, of a pump 2 and a gas admixture device 4 which receives air through an inlet 6 and ordinary water through an inlet 8. This device is of a known type.

The pressure applied to the water is approximately 6 bars. Generally speaking, the pressure of the source is defined in relation to the pressure in the chamber. The pressure of the source is preferably more than three times the pressure in the chamber.

The injector further comprises an "injector" wall 10 formed with an "injector" hole 12 to procure a flow of this liquid at high velocity into a chamber 14 containing a liquid mass 16.

The diameter of the hole is 2 millimeters, for example, and the liquid mass consists of water.

In accordance with the invention., the injector further comprises a deflector wall 18 disposed in the chamber 14 facing the injector hole so as to form a radial flow. This wall extends substantially parallel to the injector wall in all directions from this hole, leaving between these two walls a narrow passage 22 for the injected liquid.

The result of this is to cause vapor to appear in a cavitation pocket starting substantially at the edge of the injector hole, by virtue of the pressure drop which accompanies the acceleration of the flow. The pressure of the liquid increases rapidly downflow of this pocket by virtue of the increasing cross-section of the liquid passage 22. This increase results in part from the increasing circumference of circles concentric with the axis 20 of the injector hole in the direction away from this axis.

The injector hole is preferably substantially circular and the height of the passage between the injector and deflector walls at the edge of the injector hole is less than one quarter of the diameter of this hole so that the flow velocity of the injected liquid reaches its maximum value in the vicinity of this edge when the flow is radial. The height of the liquid passage at the edges of the injector hole is a few tenths of a millimeter, for example.

The deflector wall 18 is slightly inclined relative to the injector wall 10 so as to procure additional increase in the cross-section of the liquid passage in the direction away from the axis 20, around which the injector assembly is symmetrical, apart from the source.

Figure 2:
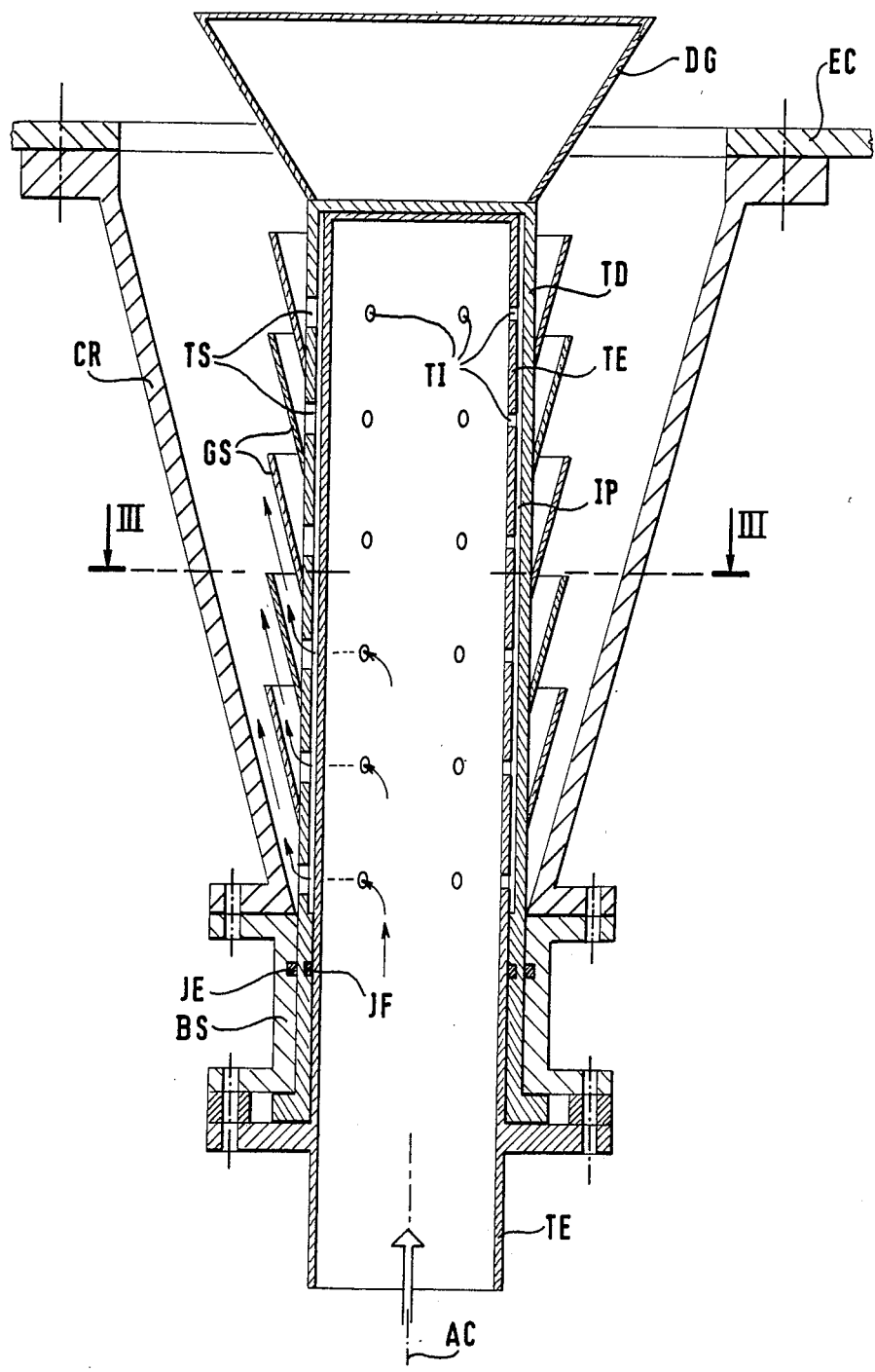
FIG. 2 shows a second embodiment of the injector in accordance with the invention in cross-section on two planes passing through the central axis of the injector, on the line II—II in FIG. 3.
Figure 3:
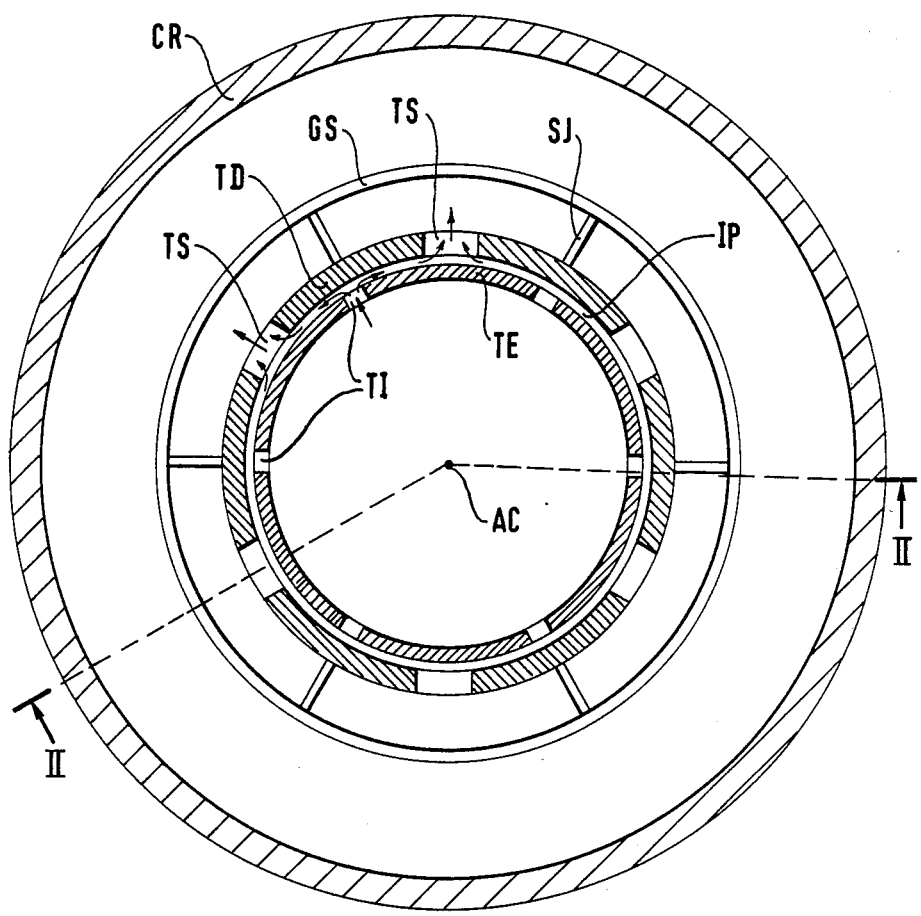
FIG. 3 shows the injector from FIG. 2 in cross-section on a plane perpendicular to the central axis of the injector, on the line III—III in FIG. 2.

In the second embodiment of the invention shown in FIGS. 2 and 3, which uses the same liquid source, the injector comprises a large number of injector holes TI (36, for example) to provide for the injection of a large number of microbubbles per second.

More precisely, it comprises:

an inlet tube TE receiving the liquid under pressure from said source and consisting of a cylinder of revolution with a central axis AC, the cylindrical side wall of this tube constituting said injector wall and being formed with a plurality of injector holes TI distributed over its surface, and a deflector tube TD disposed coaxially around the inlet tube so as to leave an annular passage IP.

This deflector tube constitutes said deflector wall facing each of the injector holes TI. It is formed with a plurality of outlet holes TS distributed over its surface to permit the liquid injected into this passage to escape. These outlet holes are situated at a distance from the injector holes. Together they provide a total liquid outlet cross-section which is a multiple of (at least double) the cross-section of the liquid passage around the plurality of injector holes. For each outlet hole the outlet cross-section in question is naturally the smaller of two cross-sections, one being that in the passage at the edge of the hole and the other being the cross-section of the hole. The purpose of this arrangement is to ensure that the cross-section limiting the flowrate of the injected liquid is limited around the injector holes and not in the vicinity of the outlet holes.

For preference, the height of this passage is less than one tenth of the diameter of the injector holes TI and the plurality of outlet holes TS has a total cross-section greater than that of the plurality of injector holes.

For preference also, the injector holes TI have a diameter between 2 and 10 millimeters (3 millimeters, for example), and they are regularly distributed over at least one area of the lateral surface of the inlet tube TE, over all this surface, for example. The height of the passage between the inlet tube TE and the deflector tube TD is substantially constant and between 0.1 and 0.5 millimeters, 0.15 millimeters, for example.

These chosen values result from the fact that the void ratio, that is to say the ratio of the total volume of the bubbles to that of the liquid, is inversely proportional to the narrowness of the passage IP and to the diameter of the injector holes TI, although a passage which is too narrow or holes which are too small entail significant risk of clogging.

The outlet holes TS are regularly distributed over all the area of the deflector tube TD facing the injector holes, and are for example interposed between these injector holes over all the lateral surface of the tubes TE and TD.

For example, the injector holes are distributed in stages regularly spaced along the central axis AC and are equi-angularly spaced around this axis in each stage, and the outlet holes are also distributed in stages within each of which they form an angular sequence with the same pitch as the injector holes, with an angular offset of one half this pitch. The axial pitches of the two sequences of stages are the same, the stages of outlet holes being coincident, as shown, with the stages of injector holes, or alternatively offset by one half the axial pitch. The outlet holes have a diameter of approximately 10 millimeters.

An outlet guide GS is preferably attached to the deflector tube TD facing each outlet hole TS so as to orient the flow of liquid from this hole and containing the microbubbles in a direction close to that of the central axis AC.

Specifically, an outlet guide GS is formed at each stage of outlet holes by a frustoconical wall of revolution coaxial with this axis and having a smaller circular end attached to the outlet tube at a distance from the outlet holes of the stage concerned, the frustoconical outlet guides of the successive stages having substantially the same half-angle at the apex less than 45°.

This half-angle at the apex may be in the vicinity of 20°, for example.

FIG. 3 also shows jet separators SJ radially linking each outlet guide GS to the deflector tube TD, disposed in angular sequence between the outlet holes TS.

The injector further comprises a receiving cone of revolution CR coaxial with the central axis AC surrounding the set of outlet guides GS and having an angle at the apex in the same sense as and not greater than that of these guides, so as to guide the flows of liquid from the outlet holes in a mean direction parallel to the central axis AC and towards the chamber EC.

Finally, the injector comprises a frustoconical main deflector of revolution DG coaxial with said central axis AC, having a smaller end attached to the side wall of the deflector tube TD on the downflow side of the outlet guides GS and having a half-angle at the apex in the same sense as and not greater than that of these guides, so as to distribute the flow of liquid from the receiving cone CR into the chamber EC.

The deflector tube TD is mounted so as to be rotatable relative to the inlet tube TE around the central axis AC so that the injector holes TI and the passage between the tube TD and the inlet tube TE may be cleaned. This rotation is permitted without loss of sealing by virtue of two O-ring seals JE and JF disposed on the upflow side of the injector and outlet holes between, on the one hand, the deflector tube TD and a fixed supporting frame BS and, on the other hand, between the deflector tube and the inlet tube TE.

It is through the intermediary of this main deflector that the deflector tube TD may be easily rotated.

The injector which has just been described can produce a voids ratio of 1% with bubbles having a diameter in the vicinity of 0.1 millimeters.

It will be understood that various changes in the details, materials and arrangements of parts which have been herein described and illustrated in order to explain the nature of the invention may be made by those skilled in the art within the principle and scope of the invention as expressed in the appended claims.

We claim:

1. Microbubble injector comprising:
    a liquid source adapted to supply at a first pressure a liquid in which at least one gas is dissolved and which is able to vaporize at ambient temperature at a second pressure lower than said first pressure,
    a chamber containing a liquid mass at a third pressure which is lower than said first pressure but higher than said second pressure,
    an injector wall,
    at least one injector hole in said injector wall through which said liquid is caused to flow at high speed into said chamber, and
    a deflector in said chamber facing said at least one injector hole and substantially parallel to and spaced from said injector wall so as to form a divergent passage for said liquid, whereby said liquid is caused to flow radially away from said at least one injector hole and vapor is caused to form in a cavitation pocket starting substantially at the edge of said at least one injector hole and the pressure of said liquid is caused to increase rapidly downflow of said pocket by virtue of the rapidly and progressively increasing cross-section of said divergent passage,
    said at least one injector hole being substantially circular and the distance between said injector wall and said deflector at the edge of said at least one injector hole being less than one quarter of the diameter of said at least one injector hole, whereby the flow velocity of said injected liquid is maximum in the vicinity of said edge when the flow is radial,
    and wherein said injector further comprises:
    an inlet tube receiving said liquid under pressure from said source and comprising a circular cylindrical wall with a central axis, the cylindrical wall of said tube constituting said injector wall and said at least one injector hole comprising a plurality of injector holes within said cylindrical wall of said tube, distributed over its surface,
    and a deflector tube disposed coaxially around said inlet tube to define an annular passage, constituting said deflector and being formed with a plurality of outlet holes distributed over its surface to permit liquid injected into said passage to escape therefrom, said outlet holes being spaced from said injector holes and together providing a total liquid outlet cross-section which is a multiple of the total cross-section of liquid flow in said passage around said injector holes.

2. Injector according to claim 1, wherein the height of said passage is less than one tenth of the diameter of said injector holes.

3. Injector according to claim 2, wherein said liquid is water and:
    said first pressure is more than three times said third pressure,
    the diameter of each of said injector holes is between 2 and 10 millimeters,
    said injector holes are regularly distributed over at least one area of said cylindrical wall of said inlet tube,
    the height of said passage between said inlet tube and said deflector tube is substantially constant and between 0.1 and 0.5 millimeters,
    and said outlet holes are regularly distributed over all of the area of said deflector tube facing said injector holes.

4. Injector according to claim 1, wherein said deflector tube is rotatable relative to said inlet tube about said central axis, whereby said injector holes and said passage may be cleaned.

5. Injector according to claim 1, further comprising an outlet guide attached to said deflector tube facing each outlet hole so as to orient the flow of said liquid from said outlet hole in a direction close to that of said central axis.

6. Injector according to claim 5, wherein said outlet holes are distributed in stages spaced regularly along said central axis and equi-angularly distributed within each stage around said central axis, and wherein:
    said outlet guide associated with each of said stages is formed by a frustoconical wall of revolution coaxial with said central axis with a smaller circular end attached to said outlet tube at a distance from said outlet holes of the stage concerned, the frustoconical outlet guides of all stages having substantially the same half-angle at the apex of less than 45°,
    and said injector further comprises jet separators linking each of said outlet guides radially to said outlet tube, each disposed between two successive outlet holes of the stage concerned and adapted to orient the flow of liquid from said outlet holes along generatrices of a common cone before the flows of liquid from two consecutive holes encounter one another, and
    a receiving cone of revolution coaxial with said central axis surrounding the outlet guides and having an angle of the apex in the same sense as and not greater than that of said outlet guides and adapted to guide the flows of liquid from all said outlet holes in a mean direction parallel to said central axis and towards said chamber.

7. Injector according to claim 6, further comprising a frustoconical main deflector of revolution coaxial with said central axis, having a smaller end attached to said cylindrical wall of said deflector tube on the downflow side of said outlet guides and a half-angle at the apex in the same sense as and not greater than that of said outlet guides, adapted to distribute the flow of liquid from said receiving cone into said chamber.

* * * * *